Oct. 15, 1929. O. O'SULLIVAN Re. 17,459

THREAD GUIDE FOR SPINNING MACHINES

Original Filed Nov. 24, 1923

INVENTOR
Otho O'Sullivan,
BY
Harold D. Penney ATTORNEY

Reissued Oct. 15, 1929

Re. 17,459

UNITED STATES PATENT OFFICE

OTHO O'SULLIVAN, OF WILLIMANTIC, CONNECTICUT; MICHAEL E. SULLIVAN, ADMINISTRATOR OF SAID OTHO O'SULLIVAN, DECEASED, ASSIGNOR TO MARY A. NOONAN, OF NEW YORK, N. Y.

THREAD GUIDE FOR SPINNING MACHINES

Original No. 1,500,258, dated July 8, 1924, Serial No. 676,752, filed November 24, 1923. Application for reissue filed January 21, 1926. Serial No. 82,831.

This invention has reference to guides for winding or spinning machines, where a thread is drawn from one spool or bobbin and wound upon another spool.

The object of the present invention is to provide a thread guide that will have its portion adapted to engage a thread of considerable extent or area, and which member can be readily shifted or adjusted whereby a considerable number of different surfaces can be brought to position for engagement with the thread, and by a comparatively small and simple adjustment on the support for the guide member.

A further object of the invention is to provide a special guide arm to prevent the thread movement away from its desired engaging position, and which member is also made adjustable to be shifted corresponding with the shifting movement of the thread engaging portion.

In the accompanying drawing showing one embodiment of my invention,

Figure 3:
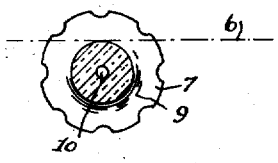
Fig. 3 is a transverse section.
Figure 1:
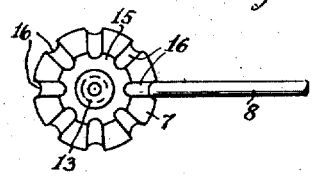
Fig. 1 is a side elevation of the device.

In the use of such devices as these, especially where the member that engages the thread is formed of a non-metallic substance such as porcelain, it is found that the friction of the thread passing against the guide surface will soon wear away such surface and provide a groove which becomes injurious to the thread. It then becomes necessary to provide a fresh unworn surface for the thread. In the present invention I provide a thread guide which has a large number of available thread engaging portions, and the guide member itself is readily adjustable on its support to bring different portions of such member into the path of movement of the thread; and which portion will be brought to the same path of movement by such adjustment, and without shifting the supporting member.

In the arrangement shown herein I provide a support in the form of a disc or spool 7 that is adjustably carried by a supporting member in the form of a rod or stem 8. The disc is shown as provided with a comparatively deep annular groove 9. The disc is provided with a bore 10, into which projects the end portion 12 of the stem, that is bent to extend at a right angle to the stem 8. This bent portion is passed through the bore of the spool, and the extremity is provided with suitable fastening means, such as a nut 13 engaging the screw thread extremity 14 of the stem. It will be understood that when this nut is tightened against the side face 15 of the spool, the latter will be pressed on the bent portion of the stem until the opposite face 15′ of the spool will engage the stem 8.

Figure 4:
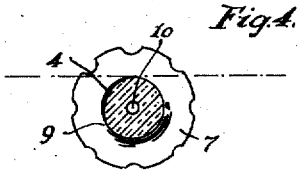
Fig. 4 is a similar view showing wear in the disc by the thread.

Upon loosening the nut 13 the spool can obviously be turned on the bent stem and a different portion of the grove 9 will be brought to the path of movement of the thread 6, as indicated in Figs. 3 and 4, where as shown in Fig. 4 the shaded portion 4 represents a worn portion of the spool groove, that by slightly turning the spool will cause a fresh unworn part to engage the thread 6, and the nut 13 is again tightened to secure the spool in this position.

Figure 2:
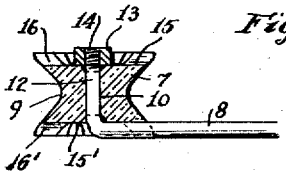
Fig. 2 is a longitudinal section.

While such an arrangement would provide a considerable number of adjustments for the spool on the stem, I preferably provide abutment portions on the spool for engagement with the stem. As shown the spool on the side 15′ is provided with a series of projections forming notches or radial groves 16′, of a size to fit the stem 8 that is brought to register therewith as indicated in Fig. 2. As shown I provide eight of these radial grooves that will give eight different positions of adjustment for the spool on the stem and which will be equally spaced apart. When any one place becomes worn by the thread 6 the nut 13 is loosened and the spool slightly moved to bring the groove away from the stem 8, and then the spool is turned to bring an adjacent groove 16 opposite the stem, when the nut is again tightened. Each fresh surface of the spool groove is in the same position relative to the path of the thread 6.

Figure 5:
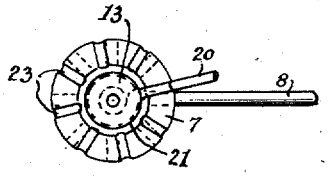
Fig. 5 shows a modified form of the device with the guide or thread retainer, in side elevation.
Figure 6:
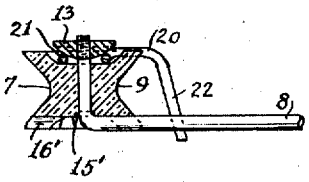
Fig. 6 is a transverse section through the device as shown in Fig. 5.

It is further desirable to provide a kind of guide or retainer for the thread to prevent its getting out of the spool groove. In Figs. 5 and 6 I show a guide formed by a rod 20 having a loop 21 adapted to be clamped between the nut 13 and the adjacent face of the spool, as clearly shown in Fig. 6. The end portion 22 of the guide extends transversely across the plane of the spool, and also that of the stem 8, as indicated in Fig. 6. This member and the stem 8 will prevent the thread from moving out of the groove. When the nut is loosened to adjust the spool on the stem, the guide arm 22 can also be shifted to retain it in proximity to the stem. The side 15′ of the spool may also be provided with a series of projectors forming notches or radial grooves 23 arranged to engage the stem 20, and which grooves are arranged similar to the grooves 16′ on the opposite side. When the spool is shifted on the stem to engage another groove with the stem, the guide arm is also shifted in a similar manner, to engage the next groove, and will thus maintain its position relative to the supporting stem 8.

It will be noted, by referring to Fig. 5, that the retainer 20 is angularly bent, so that the extension 22 thereof overlies the supporting stem 8 permitting the ready introduction of thread therein by a sidewise motion of the thread. In order to accommodate the desired angular relation of the retainer to the supporting stem in the grooves 16 on opposite sides of the guide 7 the said grooves are spaced in staggered relation to each other on opposite sides and they therefore maintain the retainer and support rod 8 in the desired relation.

What I claim is:

1. A thread guide, comprising a disc provided with an annular groove for frictionally engaging a thread, the disc having an axial bore, a holder for the disc comprising a rod bent to extend transversely at its end portion and adapted to engage the disc bore, securing means on the free projecting end of the rod bent portion, the disc having a plurality of means for engagement with the stem on one side face, whereby the securing means will clamp the stem at such portions to hold the disc against turning, and on loosening such securing means the disc can be shifted on the stem for engagement with other said engaging means and clamped in such adjusted positions by said means, and a thread guide held by said stem retaining means on the opposite face the disc in adjusted positions, said guide having an arm deflected across the plane of the disc and that of the stem.

2. A thread guide, comprising a disc provided with an annular groove for frictionally engaging a thread, the disc having an axial bore, a holder for the disc comprising a rod bent to extend transversely at its end portion and adapted to engage the disc bore, securing means on the free projecting end of the rod bent portion, the disc having a plurality of means for engagement with the stem on one side face, whereby the securing means will clamp the stem to hold the disc against turning, and on loosening such securing means the disc can be shifted on the stem for engagement with other said means for engagement and clamped in such adjusted positions by said means, and a thread guide held by said stem retaining means on the opposite face of the disc in adjusted positions, said guide having an arm deflected across the plane of the disc and that of the stem, the disc having abutment portions on said face for engagement with the guide to permit adjustment thereof to correspond with adjustment of the stem.

3. A thread guide, comprising a disc provided with an annular groove for the thread, the disc having an axial bore, a holder for the disc comprising a rod bent to extend transversely at its end portion and adapted to engage the disc bore, securing means on the free projecting end of the rod bent portion, the disc having abutment portions for engagement with the rod on one side face, whereby the securing means will clamp the rod at such portion to hold the disc against turning, and on loosening such securing means the disc can be shifted on the rod for engagement with other of said abutment portions and clamped in such adjusted positions by said securing means, and a thread guide held by said securing means in adjusted positions, to permit adjustment thereof to correspond with adjustment of the rod.

4. A thread guide, comprising a disc provided with an annular groove for a thread, a holder for the disc, securing means on the holder, the disc having abutment portions for engagement with the holder on one side face, whereby the securing means will clamp the holder to hold the disc against turning, and on loosening such securing means the disc can be shifted for engagement with other of said abutment portions and clamped in such adjusted positions by said securing means, and a thread guide held by said securing means on the opposite face of the disc in adjusted positions, the said guide having an arm deflected across the plane of the disc and that of the stem.

5. A thread guide, comprising a disc provided with an annular groove for a thread, a holder for the disc, securing means on the holder, the disc having abutment portions for engagement with the holder on one side face, whereby the securing means will clamp the holder to hold the disc against turning and on loosening such securing means the disc can be shifted for engagement with other of said abutment portions and clamped in such adjusted positions by said securing means, and a thread guide held by said securing means on the opposite face of the disc in adjusted positions, said guide having an arm deflected across the plane of the disc and that of the stem, the disc having abutment portions on said face for engagement with the guide to permit adjustment thereof to correspond with adjustment of the stem.

6. A thread guide, comprising a disc provided with an annular groove for a thread, the disc having an axial bore, a holder for the disc comprising a rod bent to extend transversely at its end portion and adapted to engage the disc bore, securing means on the free projecting end of the rod bent portion, whereby the securing means will clamp the stem on one side face to hold the disc against turning, and on loosening such securing means the disc can be shifted on the stem and clamped in such adjusted positions by said securing means, and a thread guide held by securing means in adjusted positions.

7. A thread guide of the class described, comprising a spool of vitreous material having means for receiving and lockably securing thereto a support rod through one side thereof; and means on the opposite side of said spool for lockably securing a thread retainer in angular indexed relation to said support rod.

8. A thread guide of the class described, comprising a vitreous grooved body having a rod supporting means thereon; and a plurality of radial grooves on opposite sides thereof; one set of grooves on one side of said guide being located in staggered relation to the corresponding grooves on the opposite side thereof.

9. A thread guide comprising a support; a body rotatably mounted on said support and provided with notches and an outwardly opening annular groove disposed around the axis of rotation of the body; and means engageable in said notches to hold the body against rotation and definitely locate the wear at different points.

10. In combination, a vitreous peripherally grooved body provided with a bore and a plurality of lateral projections forming notches; a supporting rod comprising a stem engageable between said projections, and a portion projecting through said bore; and means on said portion to hold said stem in one of the notches to hold the body against rotation.

11. In combination, a peripherally grooved body provided with a bore and a plurality of notches arranged around the bore; a supporting rod comprising a stem engageable in said notches and a laterally bent threaded end portion projecting through said bore; and a nut on said threaded end portion to hold said stem in one of the notches.

12. In combination, a vitreous peripherally grooved body provided with an axial bore and a plurality of notches arranged around the periphery of a side face of the body; a supporting rod comprising a one piece wire bent to form a stem engageable in any one of said notches and an angularly bent threaded end portion projecting through said bore; and means including a nut on said threaded end portion, for engagement with the body to hold said stem in one of the notches to postively hold the body against rotation.

13. A thread guide comprising a support; an annularly grooved body adjustably mounted thereon; means for locating said body in different definite predetermined positions of adjustment definite equal distances apart; and releasable means for positively holding said body in said different predetermined positions of adjustment.

14. A thread guide comprising an annularly grooved body; and releasable means for positively holding said body in different predetermined positions of adjustment.

15. In combination, a guide body provided with a bore and a plurality of lateral projections; a supporting rod engageable between said projections and provided with a portion projecting through said bore; and means on said portion to hold said rod in one of the notches and movable endwise of said portion to release said portion from the notches.

16. A thread guide comprising a rotatable porcelain body having a peripheral annular groove therearound; means co-operating with the groove to guide thread through said groove whereby practically invisible wear takes place in the groove at a limited portion of the groove; and means for locating said body at definite different angles of its rotation relative to the thread at its point of contact, said definite angles being equal angles apart for substantially uniformly distributing the wear around the groove without inspection of the invisible wear.

17. A thread guide comprising a rotatable porcelain body having a peripheral annular groove therearound; means co-operating with the groove to guide thread through said groove whereby practically invisible wear takes place in the groove at a limited portion of the groove; and means for substantially uniformly distributing the wear around the groove without inspection of the invisible wear.

18. A thread guide comprising a rotatable porcelain body having a peripheral annular groove therearound adapted to receive a thread guided through said groove at a definite angle to the groove whereby practically invisible wear takes place in the groove at a limited portion of the groove; and means for locating said body at definite different angles of its rotation relative to the thread at its point of contact, said definite angles being equal angles apart for substantially uniformly distributing the wear around the groove, without inspection of the invisible wear.

19. A thread guide comprising a rotatable body having an annular groove therearound adapted to receive a thread guided to said groove at a definite angle whereby wear takes place in the groove at a limited portion of the groove; and means for locating said body at definite different angles of its rotation relative to the thread at its point of contact, said definite angles being equal angles apart for substantially uniformly distributing the wear around the groove.

20. A thread guide comprising a rotatable body having an annular groove therearound; means co-operating with the groove to guide thread through said groove whereby wear takes place in the groove at a limited portion of the groove; and means for locating said body at definite different angles of its rotation relative to the thread at its point of contact, said definite angles being equal angles apart for substantially uniformly distributing the wear around the groove.

21. A threaded guide comprising a support; a body rotatable on said support; and means associated with the body for locating the body in positions substantially equal angles apart, at definite predetermined angles relative to the support; said body being provided with an annular groove therearound adapted to receive thread guided through the groove, at a constant angle, whereby said thread is received at different limited parts of the groove depending upon which of said positions the body is located in relative to said support; whereby the points of wear in the groove may be definitely determined definite predetermined substantially equal angles apart and the wear evenly distributed around the groove.

22. A threaded guide comprising, a support; a body rotatable on said support; and locating means associated with the body for locating the body in positions substantially equal angles apart, at definite predetermined angles relative to the support; said body being provided with an annular groove therearound adapted to receive thread guided through the groove, at a constant angle, whereby said thread is received at different limited parts of the groove depending upon which of said positions the body is located in relative to said support; said locating means, said body and said groove co-operating to give the new function of definitely determining the points of wear in the groove definite predetermined substantially equal angles apart resulting in the further new function of distributing the wear uniformly around the groove.

23. A threaded guide comprising, a support; a body rotatable on said support; and means associated with the body for locating it in positions at definite predetermined angles relative to the support; said body being provided with an annular groove therearound adapted to receive thread, guided through the groove at a constant angle, whereby said thread is received at different limited parts of the groove depending upon which of said positions the body is located in relative to said support, whereby the points of wear in the groove may be definitely determined definite predetermined angles apart distributed around the groove.

24. A threaded guide comprising, a support; a body rotatable on said support provided with an annular groove therearound; and means associated with the body for locating it in positions, substantially equal angles apart, at definite predetermined angles relative to the support.

OTHO O'SULLIVAN.